United States Patent [19]
Uchida

[11] 3,731,957
[45] May 8, 1973

[54] BALL JOINTS
[75] Inventor: Yasuo Uchida, Hamamatsu, Japan
[73] Assignee: Ishikawa Tekko Kabushiki Kaisha, Tokyo, Japan
[22] Filed: Oct. 1, 1971
[21] Appl. No.: 185,769

[30] Foreign Application Priority Data
Oct. 13, 1970 Japan..................45/89793

[52] U.S. Cl....................................287/87
[51] Int. Cl..............................F16c 11/06
[58] Field of Search..............287/87, 90 R, 90 C

[56] References Cited
UNITED STATES PATENTS
2,727,768   12/1955   Latzen...................287/90 R
3,216,753   11/1965   Oishei....................287/87
3,347,576   10/1967   Templeton............287/90 C FOREIGN PATENTS OR APPLICATIONS
816,567   7/1959   Great Britain............287/90 R OTHER PUBLICATIONS
German printed application No. 1,087,019, Ehrenreich, 8/1960

Primary Examiner—Andrew V. Kundrat
Attorney—Stevens, Davis, Miller & Mosher

[57] ABSTRACT

A ball joint comprising a ball stud having a spherical head, and a socket for receiving said spherical head of said ball stud. Said spherical head of said ball stud has a portion which is made of a resilient material.

4 Claims, 2 Drawing Figures

PATENTED MAY 8 1973

3,731,957

BALL JOINTS

This invention relates to ball joints in general. More particularly, it is concerned with a ball joint used in connections in a steering mechanism of motor vehicles, such for example as one interposed between a Pitman arm and a relay rod, a relay rod and a tie rod, or a tie rod and a knuckle arm, and in various connections in a suspension mechanism of motor vehicles.

Heretofore, it has hitherto been customary to prevent play or wobbling of ball joints by applying pressure to the ball joint from outside the spherical head of the ball stud through a seat member by utilizing the resilience of a metallic spring or rubber to remove play or wobbling of the ball stud in the socket.

According to this invention, there is provided a ball joint comprising a ball stud having spherical head, and a socket for receiving the spherical head of the ball stud, such spherical head having a portion which is made of a resilient material. The provision of the resilient material portion in the spherical head of the ball stud is effective to automatically compensate for or remove play or wobbling of the joint by the reaction of the resilient material portion.

Figure 1:
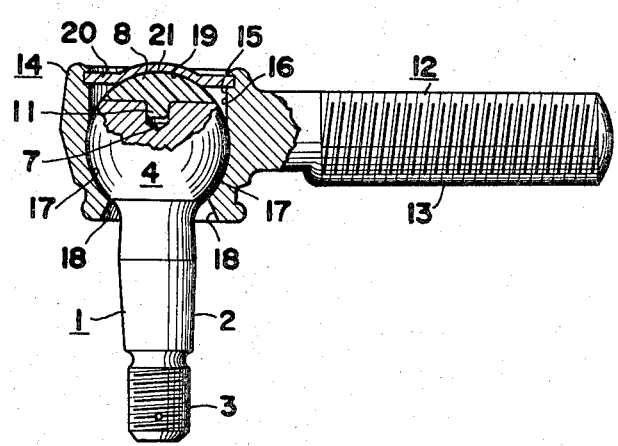
Figure 2:
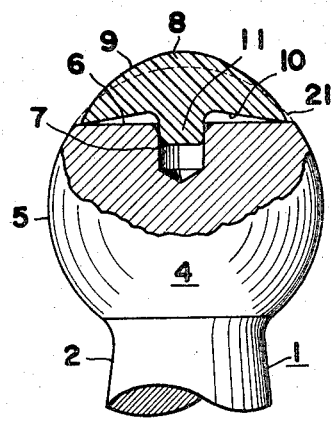

Additional objects as well as features and advantages of this invention will become evident from the description set forth hereinafter when considered in conjunction with the accompanying drawing, in which:

FIG. 1 is a front elevation of the ball joint comprising a preferred embodiment of this invention, with certain parts being cut out; and FIG. 2 is a sectional view, on an enlarged scale, of the head of the ball stud.

This invention will now be described with reference to a preferred embodiment shown in the drawing. The numeral 1 is a ball stud comprising a shank 2, an externally threaded portion 3 provided at one end portion of shank 2, and a substantially semi-spherical head 4 disposed at the opposite end portion of shank 2 which are formed integrally with one another.

Substantially semi-spherical head 4 includes peripheral spherical arc portions 5 and a planar surface portion 6 formed at the top and disposed normal to shank 2. Planar portion 6 is formed at its central portion with an engaging recess 7.

The numeral 8 is a resilient material portion made, for example, of polyurethane, nylon or other elastomer plastic, which is formed at one side thereof in a lengthwise side shape of an ellipse as indicated at 9 and at the other side thereof in a conical concave shape as indicated at 10. Conical concave shape side 10 is formed at its central portion with an engaging projection 11 which is adapted to engage in the engaging recess 7 formed in the head 4 of ball stud 1.

The resilient material portion 8 is mounted on the planar surface portion 6 of the substantially semispherical head 4 by fitting engaging projection 11 in engaging recess 7.

The numeral 12 is a socket comprising an externally threaded rod portion 13 and a joint portion 14 formed integrally with each other. Joint portion 14 is formed with a bore 15 disposed normal to threaded rod portion 13. Bore 15 comprises a cylindrical surface portion 16 of substantially the same diameter as the head 4 of ball stud 1, a spherical arc portion 17 of substantially the same diameter as cylindrical surface portion 16 and an inclined surface portion 18 of a diameter smaller than that of cylindrical surface portion 16 but becoming increasingly greater in going outwardly, the portions 16, 17 and 18 of bore 15 being contiguous to one another.

The head 4 of ball stud 1 is pushed into the joint portion 14 of socket 12 and mounted therein, with a cover 20 formed at its central portion with a spherical concave portion 19 pressing against the resilient material portion 8 of head 4.

When head 4 of ball stud 1 and resilient material portion 8 are mounted in the joint portion 14 of socket 12, resilient material portion 8 pressed by cover 20 is deformed from an elliptic surface shape into an arcuate surface shape as indicated at 21, so that arcuate surface portion 21 forms, when combined with peripheral spherical arc portions 5 of head 4, a substantially spherical portion.

Operation of the ball joint constructed as aforementioned will now be explained. When ball stud 1 moves in oscillating motion, resilient material portion 8 moves in concentric circular motion with the head 4 of ball stud 1 as a unit. Since resilient material portion 8 is pressed by cover 20 and subjected to resilient deformation, the head 4 of ball stud 1 is maintained at all times in pressing engagement with the spherical arc portion 17 of the bore 15 in the joint 14 of socket 12, thereby removing or reducing to the minimum play or wobbling of the ball in the joint portion of the socket.

From the foregoing description, it will be appreciated that the major diameter head of the ball stud is urged at all times by the resilient material portion to press against the arcuate surface portion of the bore in the socket with a uniform force. This arrangement is effective to eliminate play between the sliding contact surfaces and permits smooth pivotal movements of the ball stud.

What is claimed is:

1. A ball joint assembly comprising
   a ball stud having a spherical head,
   a socket for receiving said spherical head of said ball stud, and
   a cover, said spherical head comprising a truncated semi-spherical head portion and an element having an elliptic surface resilient material portion seated on a flat surface of the truncated semi-spherical head portion, said resilient material portion being sized to finally deform from the elliptic surface shape into an arcuate semi-spherical surface shape so that said arcuate semi-spherical surface of said resilient material position is contiguous with the arcuate surface portion of said truncated semi-spherical head by applying said cover to the resilient material portion to provide a substantially spherical bearing head, said element also being formed with a substantially conical concave portion at a side thereof opposite the elliptic surface side.

2. The ball joint assembly of claim 1, wherein an engaging portion is formed in the head of the ball stud, and an engaging portion which is complementary with the engaging portion formed in the head of the ball stud is formed in the element having the resilient material portion, said two engaging portions being brought into engagement with each other when the element having the resilient material portion is mounted on the head of the ball stud in the assembled joint.

3. The ball joint assembly of claim 2, wherein said engaging portion formed in the head of the ball is an engaging projection.

4. The ball joint assembly of claim 2, wherein said engaging portion formed in the head of the ball is an engaging recess.

* * * * *